June 24, 1958   W. H. HARSTICK ET AL   2,839,981
MOUNTING MEANS FOR A BALER ON A TRACTOR
Filed Dec. 13, 1955   5 Sheets-Sheet 1
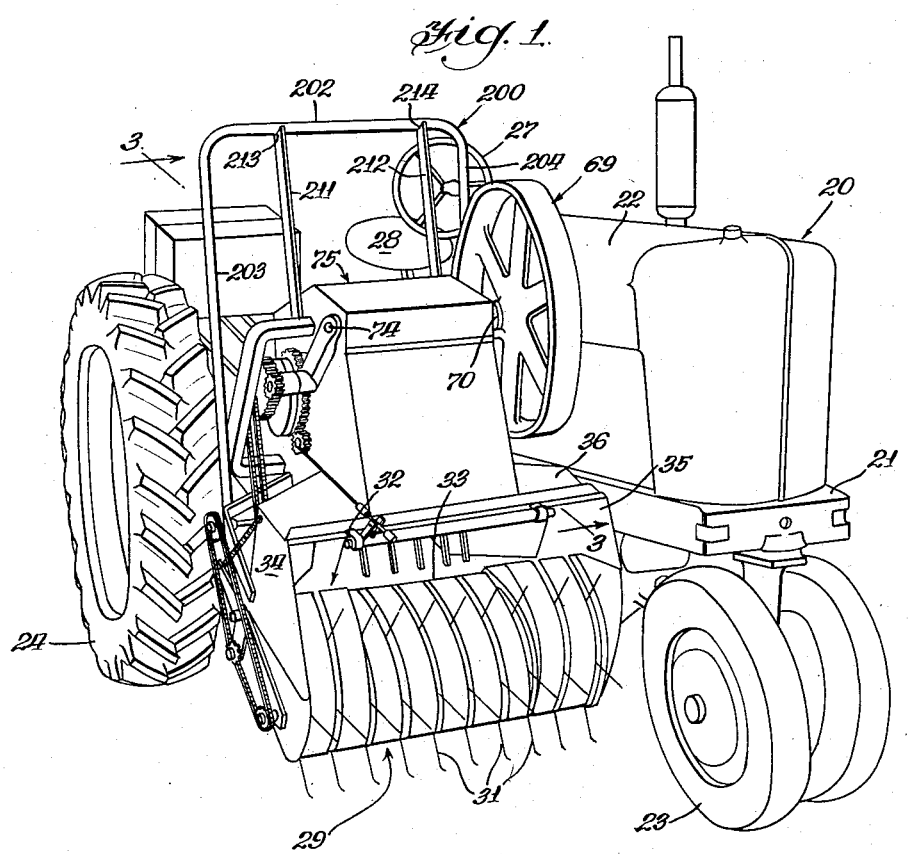
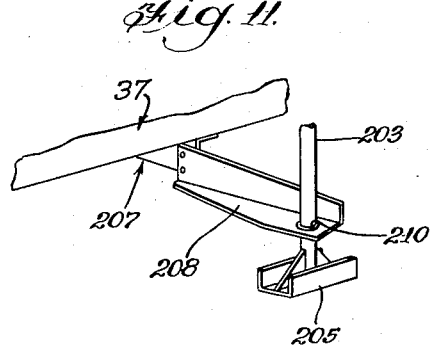
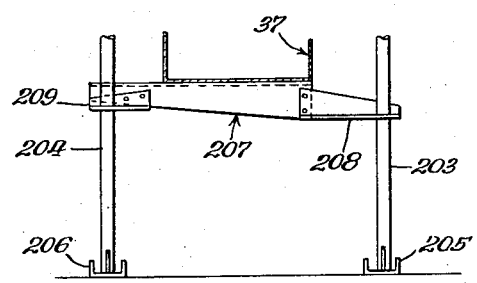
INVENTORS.
William H. Harstick
Patrick L. May
Paul O. Pippel
Atty.

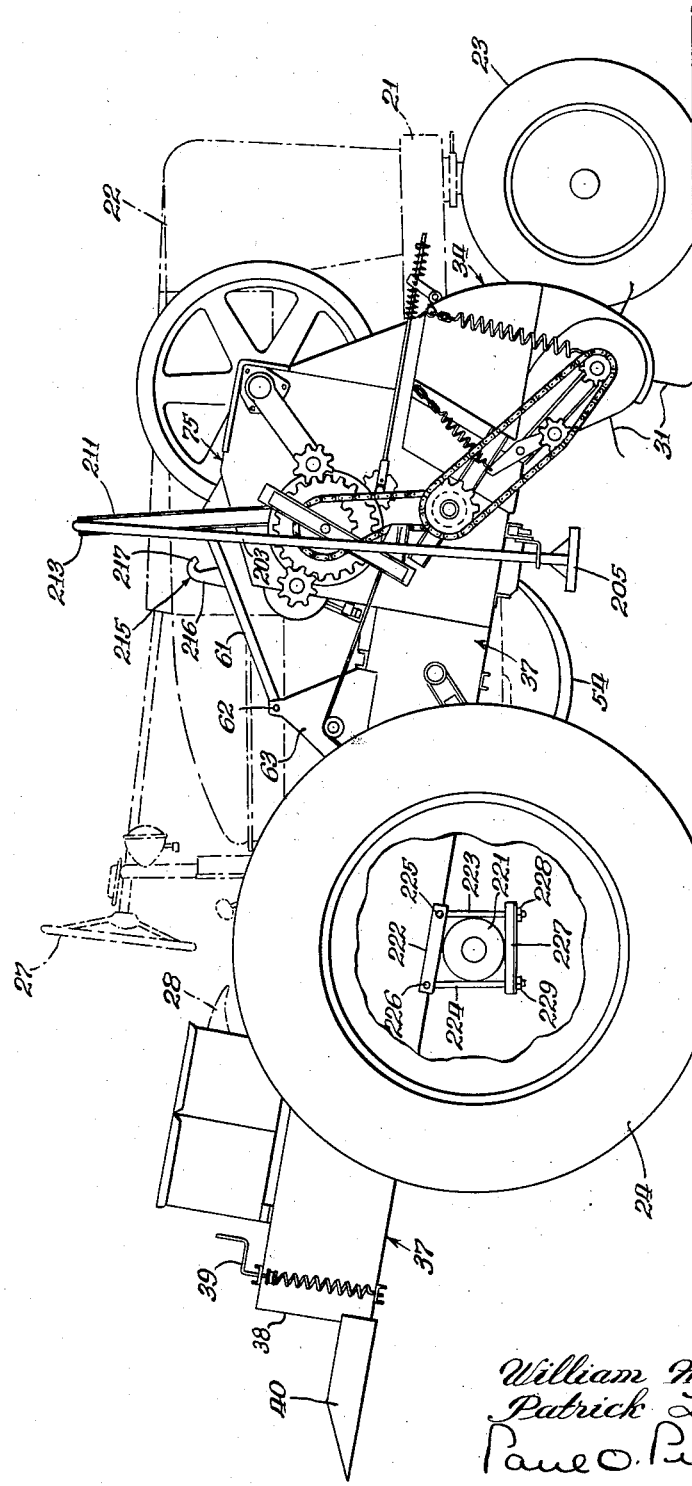

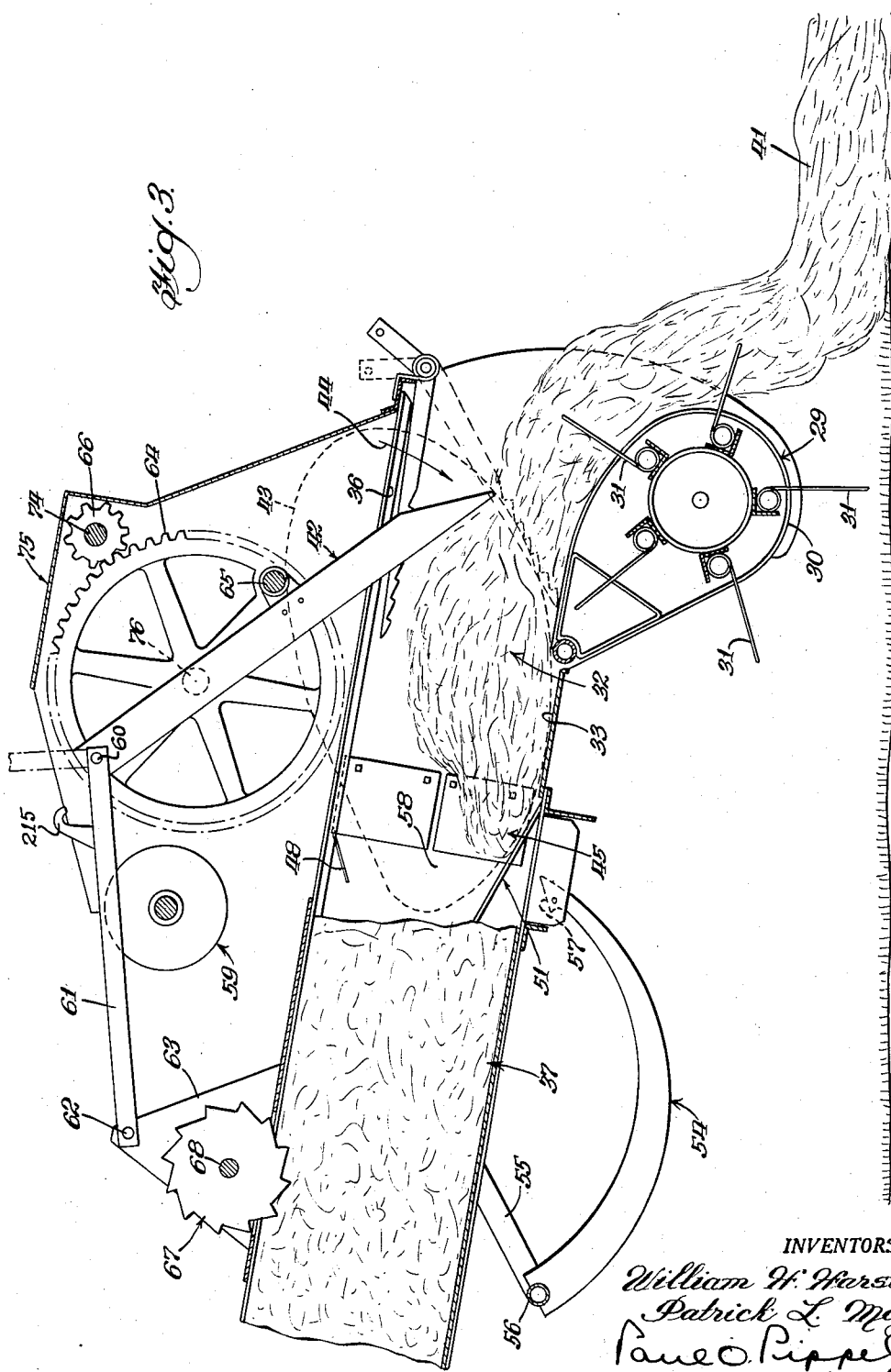

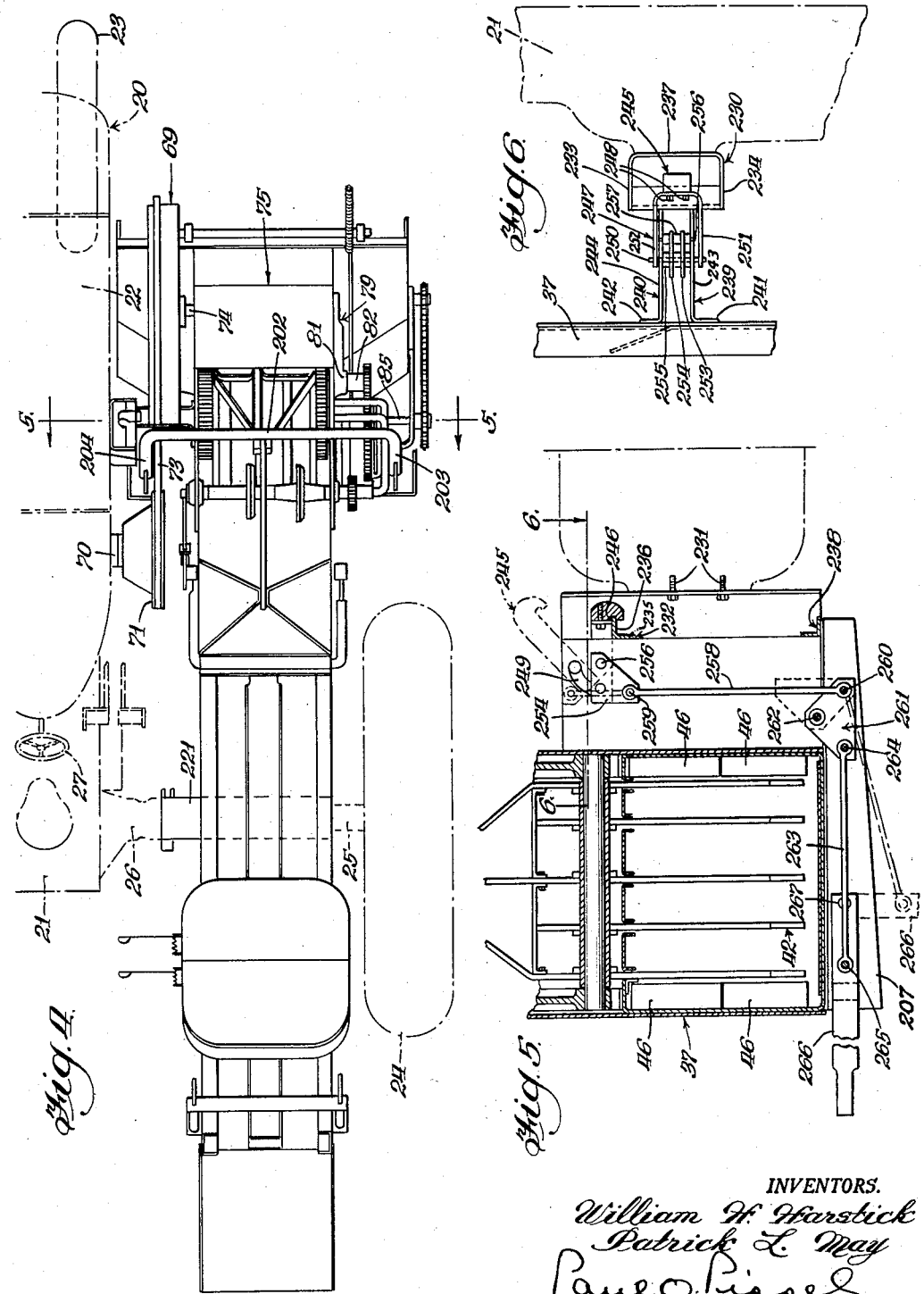

June 24, 1958 W. H. HARSTICK ET AL 2,839,981
MOUNTING MEANS FOR A BALER ON A TRACTOR
Filed Dec. 13, 1955 5 Sheets-Sheet 5
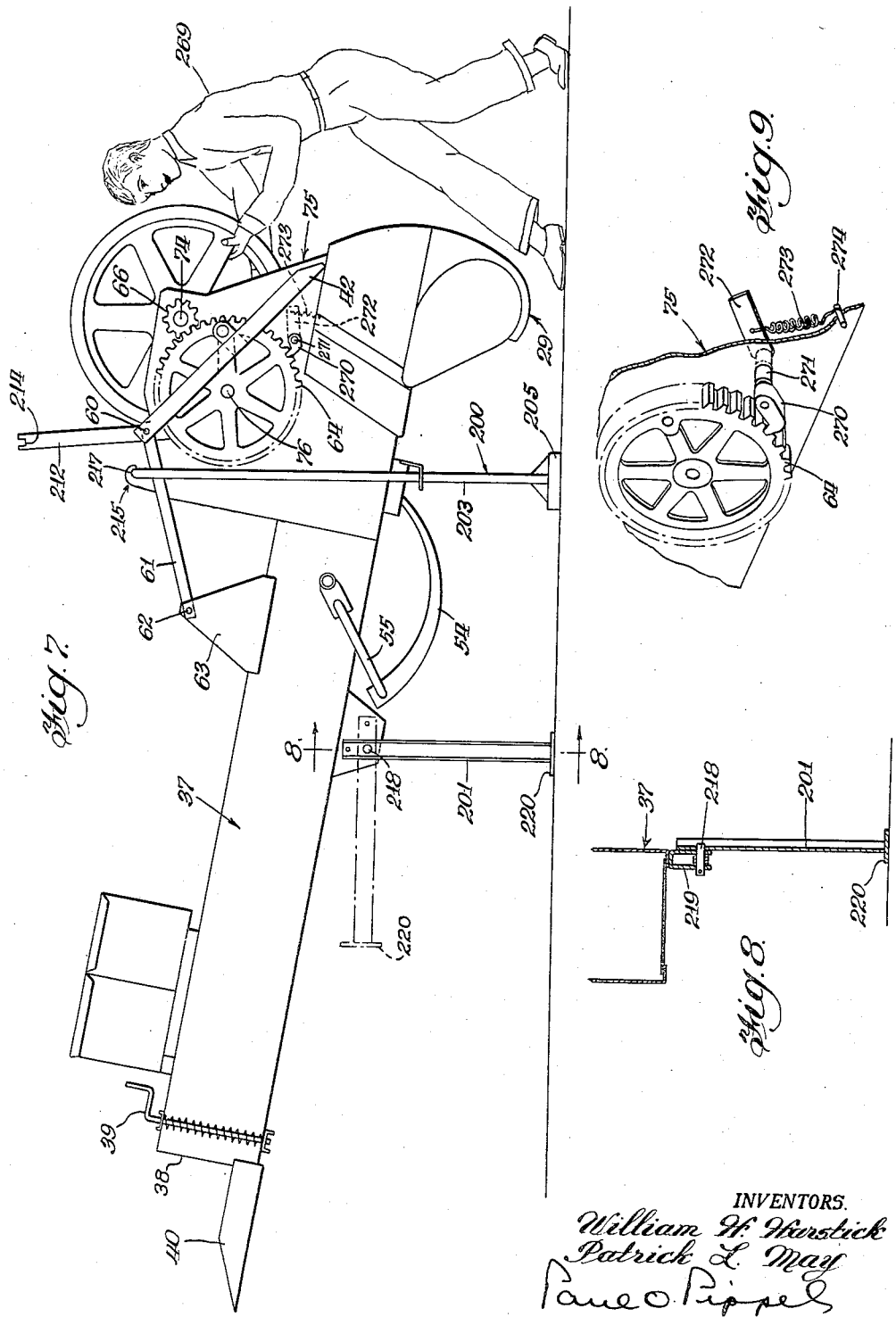
INVENTORS.
William H. Harstick
Patrick L. May
Paul O. Pippel
Atty.

United States Patent Office 2,839,981
Patented June 24, 1958

2,839,981

MOUNTING MEANS FOR A BALER ON A TRACTOR

William H. Harstick and Patrick L. May, Memphis, Tenn., assignors to International Harvester Company, a corporation of New Jersey Application December 13, 1955, Serial No. 552,833

3 Claims. (Cl. 97—47.15)

This invention relates to a new and improved mounting means for a baler on a tractor.

A hay baler is one of the larger agricultural implements and thus it is one of those machines which is normally pulled behind a tractor. In other words, it is unwieldly to attempt to mount a baler on a tractor because of its size and shape. It is, therefore, a principal object of the present invention to provide a relatively light and compact hay baler which may be conveniently mounted on a tricycle type of tractor wherein the bale forming chamber is disposed relatively longitudinally between the rear traction wheel and the elongated body of the tractor.

Another important object of this invention is the provision of mounting means for a hay baler on a tractor.

A still further important object of this invention is to equip a light compact hay baler with means for mounting the baler onto the side of a tractor in such a manner that the mounting may be accomplished conveniently by a minimum of personnel and more particularly by one operator.

A still further important object of this invention is to supply jack means mounted unitary with a hay baler whereupon one end of the hay baler may be jacked upwardly to accomplish a mounting thereof on the tractor with a minimum of manual effort.

Another and still further important object of this invention is to provide a vertically disposed U-shaped bail member which is slidable in spaced relative vertical positionings on the baler whereupon in its ground engaging position the baler may be hooked onto the U-shaped frame member and lifted upwardly manually relative to the ground whereupon the baler may be conveniently attached to the tractor.

Another and further important object of this invention is to supply mounting means for quickly attaching and detaching a baler onto a tractor and wherein the control for the mounting means is remotely positioned outside of the baler for easy access to the operator.

Other and further important objects and advantages will become apparent from the disclosures in the following specification and accompanying drawings.

In the drawings:

Figure 1 is a perspective view of the tractor mounted baler of this invention;

Figure 2 is a side elevational view of the tractor mounted baler of Figure 1;

Figure 3 is a longitudinal sectional view taken through the bale-forming chamber on the line 3—3 of Figure 1;

Figure 4 is a top plan view of the baler showing a portion of the tractor on which the baler is mounted and with the pickup removed;

Figure 5 is a sectional view taken on the line 5—5 of Figure 4;

Figure 6 is a sectional view taken on the line 6—6 of Figure 5;

Figure 7 is a side elevational view of the baler of this invention removed from the tractor and with portions thereof broken away;

Figure 8 is a detail sectional view taken on the line 8—8 of Figure 7;

Figure 9 is an enlarged perspective view detail of the baler raising means;

Figure 10 is an end view detail of the leg supporting members for the baler when removed from the tractor;

Figure 11 is a perspective view detail of the leg journalling member of Figures 2 and 10.

As shown in the drawings:

The reference numeral 20 indicates generally an agricultural tractor which constitutes a wheel supported frame structure. The tractor has generally elongated chassis 21 carrying an engine 22 and supported at its front end by dirigible wheels 23. The rearward end of the tractor is provided with relatively widely spaced traction wheels 24 carried on an axle 25 which is in turn mounted in an axle housing 26 as best shown in Figure 7. The spacing of the large traction wheels 24 from the narrow elongated chassis 21 is also best shown in Figure 7 of the drawing. It is this space between one of the traction wheels and the tractor in which the baler is mounted. As shown in Figures 1 and 2 the tractor is further equipped with a steering wheel 27 and an operator's seat 28 located substantially between the relatively widely spaced apart traction wheels 24.

The hay baler to be mounted on the tractor 20 generally includes a hay pickup mechanism 29 disposed at the forward end thereof. The hay pickup 29 includes a plurality of laterally spaced apart circularly disposed leaf members 30 and a plurality of radially disposed spring fingers 31 which are adapted to rotate between the circular leaves 30 and lift the hay or other material to be baled from a windrow or the like upwardly and rearwardly into a chamber 32 which constitutes a platform 33 between side walls 34 and 35 and having a top or hood portion 36. Immediately behind the pickup and platform is the bale forming chamber 37 which extends longitudinally of and substantially parallel to the elongated chassis 21 of the tractor and within the outwardly spaced rear traction wheel 24 as shown in Figures 1, 2 and 7. In the baler of this invention hay or other material to be baled is delivered to the platform and thence rearwardly directly into the front end of the bale forming chamber 37 whereupon the bales are formed and tied and delivered through the rearward end 38 of the bale forming chamber. The size of the discharge end 38 of the chamber 37 is controlled by a spring mechanism 39 which supplies suitable back pressure to create substantially dense or loose bales as desired. The outer rearward end 38 of the chamber 37 includes a discharge spout or member 40 which may be angularly inclined as desired to direct the falling bales as they emerge from the end 38 of the bale forming chamber 37.

It is believed that a general understanding of the operation of the baler portion of this device is best illustrated in Figure 3 of the drawing. The hay in a windrow is designated by the numeral 41 and is shown being lifted upwardly and rearwardly by the spring fingers 31 of the pickup cylinder 29. The fingers 31 carry the hay 41 upwardly over the top of the spaced leaf members 30 and thence onto the deck 33 within the chamber 32. The hay or other material to be baled is then carried from this front chamber 32 to the bale forming chamber 37 directly rearwardly thereof and forming a continuation thereof by means of packer fingers 42 which oscillate or gyrate in the path indicated by the numeral 43. Although the term packer "fingers" has been used it should be understood that any such member used to pack the hay is contemplated. It will thus be apparent that as the packer fingers 42 come downwardly in the direction of the arrow 44 the chamber 32 will be swept clear of hay or incoming material to be baled and thereupon move that material rearwardly past a plurality of hay tuckers as shown generally at 45. The hay tuckers are for the purpose of holding in the sides of the formed bale in such a manner that any loose straggling ends of hay are tucked into the body of the bale rather than being permitted to project outwardly and make a rough appearing bale. The side tuckers also have some restraining action against the bale material moving forwardly in the forming chamber 37. A top retainer 48 is somewhat similar to the shape and position of the side tuckers and does have some tucking effect on the loosely straggly ends of hay which might tend to project upwardly from the top of the formed bale. However, the top retainer 48 is disposed rearwardly of the side tuckers and is expressly for the purpose of holding the hay in its rearmost position after it is pushed therethrough by the swinging or oscillating packer fingers 42. Similarly a bottom retainer 51 is carried on the bottom of the bale forming chamber 37 and acts in the same manner as the top retainer 48. The bottom retainer 51 projects rearwardly beyond the side tuckers 45 in the same manner as the top retainer 48. Further, the terminal endings of the top and bottom retainers 48 and 51 respectively are within the bale forming chamber 37 at a position rearwardly of the position of the bale forming chamber through which the needles for effecting the tying of the bales passes.

Twine carrying needles 54 are shown in Figure 3 as being mounted on a crank 55 at 56. The needles 54 are generally arcuate in shape and have a leading edge 57 for carrying twine or the like upwardly through the bale forming chamber 37 through passages 58 therein and thence upwardly and out through the top of the bale forming chamber to a knotting mechanism or the like 59 which is not shown in detail in this patent application.

The packing fingers 42 are hingedly mounted at 60 on a link arm 61 which in turn is hingedly mounted at 62 on a bracket 63 forming a fixed part of the bale forming chamber 37. The packer fingers 42 are oscillatably driven by means of a gear wheel 64. The hinge connection between the gear wheel 64 and the packer finger arms 42 is shown at 65. The length of the link arm 61 controls the relative positioning of the upper end of the packer fingers 42 and oscillation or packing is accomplished by the movement of the intermediate portion of the packer fingers 42 by reason of their pivotal connection at 65 to the gear wheel 64. In other words, the packer fingers follow the path as shown at 43 in Figure 3 when the gear wheel 64 is rotated. A spur gear 66 is in meshing engagement with the large bull gear 64 and imparts rotational drive thereto to effect an oscillating movement of the packer fingers 42. The operation of the knotting mechanism 59 and movement of the needles 54 occurs when a bale metering wheel 67 rotatably mounted at 68 on the bracket 63 makes one full rotation by reason of movement of hay being baled through the bale forming chamber.

As best shown in Figures 1, 4 and 7 a large flywheel 69 is provided on the baler to supply adequate momentum to the drive of the packer fingers 42 to contribute to tightly packed bales. A power take-off shaft 70 is provided on the tractor 20 and has mounted thereon a V-pulley 71. A V-belt 73 is extended around the V-pulley 71 and the annular surface of the flywheel 69. It will thus be apparent that engine drive from the tractor 20 is delivered through the power take-off shaft 70 and through the pulley 71 to the flywheel 69 by means of a V-belt 73.

The flywheel 69 is carried on a shaft 74 which is journally mounted in a housing 75 enclosing the upper portion of the packer fingers 42 and the drive therefor. The shaft 74 has mounted thereon the pinion gear 66 as shown in Figures 3 and 7. A shaft 76 carries the large gear 64 and constitutes the axis about which the packer fingers gyrate.

Drive from the flywheel 69 to the baler mechanisms is not shown or described in detail herein as the present application is concerned with the quick and convenient mounting of a baler onto a tractor.

As best shown in Figure 7, the hay baler of this invention is shown removed from a tractor and standing on retractible leg means which include a leg means 200 at the forward end of the baler and a leg 201 toward the rear of the hay baler. The leg means 200 constitutes an inverted U-shaped or bail member having a top 202 and downwardly depending legs 203 and 204 which straddle the bale forming chamber 37 and have ground engaging pads 205 and 206, respectively. A frame member 207 is disposed beneath the bale forming chamber 37 at a position adjacent the leg means 200 and generally forwardly on the baler. The frame member 207 has laterally extending side brackets 208 and 209 which journally receive the leg members 203 and 204, respectively. This structure is best shown in Figures 10 and 11. Figure 11 clearly shows an aperture 210 through which the leg 203 slides within the bracket member 208. Post members 211 and 212 are affixed to the opposite sides of the housing 75 and extend upwardly therefrom. The tops of the spaced apart posts 211 and 212 are equipped with cradles 213 and 214, respectively, to receive the top 202 of the tubular leg means 200. Thus in the disclosures of the device, as in Figures 1, 2 and 4 wherein the hay baler is mounted onto a tractor 20, the leg means 200 is raised to a position mounted in the post cradles 213 and 214 so that the foot pads 205 and 206 are spaced above the ground line. This means that the implement is carried on the tractor and is capable of field operation without hindrance from the leg means 200.

The link arm 61, as previously stated, is hinged at 62 on the brackets 63 and oscillates in an arc about the hinge 62 for a center as the packer fingers 42 gyrate in their path of travel when the large gear 64 is rotated. Thus the arm 61 moves upwardly and downwardly with respect to the top of the bale forming chamber 37. Hook-like member 215 is weldably or otherwise attached to the arm 61 just rearwardly of the juncture of the arm 61 with the ends of the packer finger arms 42. This hook-like member 215 has a relatively broad base member 216 and an overhanging hook or the like 217. The device of this invention utilizes the swinging arm 61 and thus the hook member 217 as a means for jacking the implement about the leg means 200. When the hay baler is mounted on the tractor, the leg means 200 may be lowered from its cradle-supported position on the arms 211 and 212 to a position wherein the cross top 202 is disposed beneath the hook member 217 when the link arm 61 is in a relatively high position above the top of the bale forming chamber 37. In this position, of course, the leg means 200 and the foot pads 205 and 206 will not reach the ground line. However, upon rotating the packer finger mechanism so that the arm 61 will be lowered, the hook member 217 forces or presses downwardly on the cross top 202 of the leg means 200 whereupon a jacking operation is effected causing the legs 203 and 204 to engage the ground with their lower pads 205 and 206 and subsequently to cause the entire hay baler to be raised upwardly with respect to the leg means 200 whereupon the tractor may thus be driven away from the hay baler with the hay baler remaining standing on the front positioned leg means 200 and the rear leg member 201.

The leg member 201 is pivotally mounted about a shaft 218 on a downwardly depending bracket 219 from the bale forming chamber 37. As best shown in Figure 7, the leg 201 may be moved from its ground engaging position to an upwardly and rearwardly extending position as shown in dash lines beneath and lying substantially parallel to the bale forming chamber 37. Obviously the leg is in its upper position when the baler is in use on a tractor, and when the tractor is to be removed from the hay baler the leg 201 is dropped so that the foot or pad 220 at the lower end thereof engages the ground at a rearwardly spaced position from the engagement of the foot pads 205 and 206 of the leg means 200.

The tractor-mounted hay baler of this invention is characterized by several features, all of which contribute to the success of the machine. The hay baler is fastened to an axle housing extension 221 at substantially the rear of the tractor and is further attached by means of mechanism, hereafter to be described, at a forward position on the tractor chassis to thereupon support the front end of the hay baler. The mounting for the rear and front of the hay baler onto the tractor all contribute to this invention. A further feature is, of course, the legs to support the hay baler when it is removed from the tractor and the final feature, of course, is the utilization of the forward leg means 200 as a jack to raise the hay baler and utilizing the gear mechanism for driving the packer fingers as the source of mechanical advantage for effecting a jacking of the implement with respect to the leg means 200.

As best shown in Figure 2, a frame member 222 is fastened to the underside of the bale forming chamber 37 for positioning directly over the extended axle housing 221 of the tractor. Bolt members 223 and 224 are hinged at 225 and 226, respectively, on the frame member 222. A cross bottom member 227 is drawn up tightly against the underside of the extended axle housing 221 by means of nuts 228 and 229 on the bolt members 223 and 224, respectively. Thus when the nuts 228 and 229 are loosened on the lower ends of the bolts, the bolts may be swung away from the extended axle housing and the cross member 227 removed therefrom for dismounting of the hay baler from the tractor. However, when it is desired to hold the implement onto the tractor the assembly of elements is as shown in Figure 2 wherein the nuts are turned up tightly against the cross member 227 to thus hold the rear of the hay baler fixed with respect to the tractor.

The means for attaching the forward end of the baler to the forward end of the tractor is best shown in Figures 4, 5 and 6. The tractor chassis 21 has a channel-shaped member 230 bolted as at 231 thereto. An angle frame member 232 spans the outwardly opening leg members 233 and 234 of the channel member 230. The angle member 232 is welded or otherwise fastened to the legs 233 and 234 to thereby hold the angle member fixed with respect to the channel and thus with respect to the chassis frame 21. It thus becomes apparent that the channel 230 and the angle 232 are integral with the tractor and constitute the means on the tractor for receiving the mounting attachment of the implement. As best shown in Figure 5, the angle member 232 has a downwardly projecting face 235 and a horizontally disposed ledge 236 extending inwardly toward the base member 237 of the channel 230. It is this horizontal ledge 236 which provides the hooking surface for the attaching means on the hay baler. A second angle frame member 238 is weldably attached to and spans the channel arms 233 and 234 at a position spaced beneath the attachment of the angle frame member 232.

Bracket members 239 and 240 are weldably or otherwise fastened to the side wall of the bale forming chamber 37. These brackets 239 and 240 are equipped with portions 241 and 242 which abut the side wall of the forming chamber 37 and lie in a vertically disposed position thereon. The brackets 239 and 240 also include parallel disposed side members 243 and 244 which project outwardly from the side of the bale forming chamber 37 and provide the means for supporting the hook on the baler which engages the angle frame member 232 on the tractor. The hook is shown at 245 in Figures 5 and 6 and has a notch 246 therein to engage the top and bottom sides of the horizontally disposed flange 236 of the angle 232. The hook member 245 is fastened to a U-shaped bracket member 247 by means of bolts or the like 248. The bracket walls 243 and 244 which lie parallel to one another have arcuate slots 249 therein as best shown in Figure 5. A pin 250 is adapted to pass through the legs 251 and 252 of the U-shaped bracket 247 and the included side members 243 and 244 of the implement attached brackets 239 and 240. A pair of substantially triangular plates 253 and 254 are also supported over the shaft 250 and an included bushing 255. A second shaft 256 is journally mounted in the spaced apart walls 243 and 244 of the brackets 239 and 240 and pass through the parallel substantially triangular plates 253 and 254. Similarly, a bushing 257 is disposed intermediate the shaft 256 and the plates 253 and 254 to provide for easy hinging therebetween. A connecting link 258 is hingedly mounted at 259 on the lower apex of the substantially triangular plates 253 and 254 and it is movement of this link in a vertical direction that causes the hook 245 to move from the dash line position in Figure 5 to the full line position of the hook. The hook is shown in section at the outer end to enable showing the notch 246 snugly engaging the lip 236 of the angle member 232. As the connecting link 258 is moved upwardly, the triangular plates 253 and 254 swing as a unit about the shaft 256 and its included bushing 257, thus causing the hook 245 to move away from the angle member 232. The lower end of the connecting link 258 is hingedly mounted at 260 to a substantially triangular plate member 261 which is pivotally mounted at 262 onto the lower ends of the side walls 243 and 244 of the bracket members 239 and 240. A laterally extending connecting link 263 projects at right angles to the generally vertically extending connecting link 258 and is pivotally mounted at 264 to the substantially triangular plate member 261. The connecting link 263 projects laterally beneath the bale forming chamber 37 to a pivotal attachment at 265 to a hand lever 266. The hand lever 266 is pivotally mounted at 267 on the frame supporting member 207 projecting beneath and along the bale forming chamber. The member 207 is disposed laterally of the longitudinally extending bale forming chamber 37 and projects inwardly beyond the inner wall thereof to a position directly beneath the angle member 238 when the baler is in mounted position on the tractor. By this means the lower end of the bale forming chamber through the frame member 207 is guided and held in fixed position relative to the tractor.

In the operation of the front disposed implement attaching means the hand lever 266 is swung downwardly to a substantially vertical position, as shown in dash lines in Figure 5, whereupon the connecting link 263 causes the substantially triangular plate member 261 to swing about its hinge 262 and move the connecting link 258 vertically upwardly. Movement upwardly of the link 258, as previously stated, causes the parallel plate members 253 and 254 to swing upwardly about the shaft 256 to the dash line positions of the plates, as shown in Figure 5, whereupon the hook 245 is released from the angle member and may be lifted out of the way of the angle member to thereupon permit removal of the hay baler from the tractor. Now, when the implement has been moved into position adjacent the tractor and it is desired to hook the hay baler onto the tractor, the hand lever 266, from its position remotely disposed from the tractor, is pulled upwardly and outwardly to its horizontally disposed position as shown in full lines in Figure 5 whereupon the hook 245 is pulled downwardly through the slots 249 to thereupon grip the inner edge of the angle ledge 236 with the opening or notch 246 firmly gripping the implement to the tractor.

The last feature in the mounting of the hay baler onto the tractor constitutes the jacking mechanism on the leg means 200, as shown in Fig. 7. The person who is to do the mounting of the implement onto the tractor, or for that matter the removal of the implement from the tractor, is designated as 269. It is assumed, of course, that in removal of the implement from the tractor the packer finger arms and thus the link arm 61 will be in their highest position so that the leg means 200 may be easily placed under the hook 217 of the bracket member 215. Now it merely remains for the operator to effect a lowering of the link arm 61 to thereby cause the entire hay baler to move vertically upwardly relative to the now ground engaging leg means 200. Great mechanical advantage is possible by turning of the flywheel 69 and therefore this advantage is utilized in the elevation of the implement. The operator grabs hold of the flywheel and causes it to rotate, which thus in turn rotates the small gear 66 and the engaging large gear 64 which directly moves the packer fingers 42 and thus also the link arm 61. A pawl member 270 is supported on a shaft 271 which has an outwardly extending arm 272 to which a spring 273 is attached. The other end of the spring 273 is carried at 274 on the housing 75 of the hay baler. The pawl 270 and the arm 272 are affixed relative to each other and thus they act as a bell crank whereupon the spring 273 normally urges the pawl 270 into engagement with the large gear wheel 64. In raising the baler the pawl operates automatically. When it is desired to lower the implement operator, in addition to rotating the flywheel 69, releases the spring biased pawl 270 from engagement with the gear until such time as the implement is lowered, whereupon the operator releases the pawl permitting it to re-engage the gear 64 and thus hold the positioning of the link arm 61 and thus also the lowered position of the hay baler with respect to the leg means 200.

In the operation of the device of this invention the hay baler may either be mounted on or removed from a tractor. Let us assume, for example, that the hay baler is carried on its own legs 200 and 201, as shown in Figure 7, and it is desired to mount the implement onto a tractor. The tractor is driven into a position adjacent the hay baler in such a manner that the large traction wheel on one side of the tractor is outside of the bale forming chamber 37 and the tractor chassis is inside of the bale forming chamber with the front dirigible wheels of the tractor in line with the chassis. The tractor is moved forwardly into the hay baler from the rear so that the bale forming chamber 37 rests on the extended axle housing 221 whereupon the rear leg 201 may be swung upwardly and the clamping of the baler to the axle housing effected. Now, of course, it is necessary to slightly lower the hay baler at the forward end because it was originally necessary to have the forward end of the hay baler higher during removal to provide clearance for taking the tractor from the hay baler. Thus the mounting operation is the reversal of the previous operation for dismounting wherein the pawl 270 is released by the operator by swinging the lever 272 against the action of the spring 273 and releasably holding the flywheel 69 and allowing the implement to lower with respect to the leg means 200 until such time as the hook means 245 is substantially on a level or slightly above the angle member 232. At this position the pawl 270 is permitted to re-engage the gear wheel 64 thereupon locking the hay baler relative to the leg means 200. The next step is to effect an upward pulling of the hand lever 266 to thereupon permit the hook 245 to be manually tipped or swung downwardly and thence laterally to hook over the ledge 236 of the angle member 232. Simultaneously, of course, the frame member 207 is pulled snugly up to the bottom of the angle member 238 whereby the implement is mounted rigidly with respect to the tractor. Conversely, by a reversal of these steps for mounting, the implement may be removed from the tractor very conveniently by a single operator although the machine ordinarily is quite large and heavy.

Numerous details of construction may be varied throughout a wide range without departing from the principles disclosed herein and we therefore do not propose limiting the patent granted herein otherwise than as necessitated by the appended claims.

What is claimed is:

1. A mechanism for mounting and fastening an implement on a tractor comprising an arcuately swingable arm on said implement, transversely aligned spaced apart stationary supporting posts mounted on said implement and projecting upwardly therefrom, said posts having sockets in the tops thereof, an inverted U-shaped member having a top and downwardly extending sides, said sides straddling said implement and journalled thereon intermediate their ends for vertical sliding with respect to the implement, said sides having their bottom free ends adapted in certain positions thereof to engage the ground, means removably joining said U-shaped member top to said arcuately swingable arm whereby said implement may be raised and/or lowered relative to the ground depending upon the direction of movement of said arcuately swingable arm, means attaching said implement to said tractor when the implement is in raised position, and whereby after the implement is attached to the tractor the U-shaped member is removed from the arcuately swingable arm and placed in and across the sockets in the tops of the transversely aligned spaced apart stationary supporting posts in which position the bottoms of the sides of said U-shaped member are spaced from the ground.

2. A device as set forth in claim 1 in which said means attaching said implement to said tractor includes hook means on one side of said implement and cooperative hook-receiving means on said tractor, said hook means arranged and constructed to engage said hook-receiving means.

3. A device as set forth in claim 2 in which there is further included means swinging said hook means remotely located on the other side of said implement.

References Cited in the file of this patent

UNITED STATES PATENTS

| | | |
|---|---|---|
| 2,192,767 | Courville | Mar. 5, 1940 |
| 2,431,828 | Raney | Dec. 2, 1947 |
| 2,491,354 | Acton | Dec. 13, 1949 |
| 2,662,459 | Shore | Dec. 15, 1953 |